(12) United States Patent
Neatherlin

(10) Patent No.: US 7,112,029 B1
(45) Date of Patent: Sep. 26, 2006

(54) CARRIER APPARATUS AND METHOD

(76) Inventor: Kenneth L. Neatherlin, P.O. Box 3321, Bryan, TX (US) 77805

( * ) Notice: Subject to any disclaimer, the term of this patent is extended or adjusted under 35 U.S.C. 154(b) by 0 days.

(21) Appl. No.: 11/150,010

(22) Filed: Jun. 10, 2005

Related U.S. Application Data

(63) Continuation of application No. 10/444,707, filed on May 23, 2003, now abandoned.

(51) Int. Cl.
*B60P 3/022* (2006.01)
*B60P 3/40* (2006.01)

(52) U.S. Cl. ................ 414/458; 280/404; 280/43.23

(58) Field of Classification Search ........... 414/458, 414/460, 10–12; 280/404, 5.28
See application file for complete search history.

(56) References Cited

U.S. PATENT DOCUMENTS

| | | | | |
|---|---|---|---|---|
| 2,053,731 A | * | 9/1936 | Mussey et al. ........... 105/199.3 |
| 2,859,978 A | * | 11/1958 | Brimhall .............. 280/124.123 |
| 3,155,484 A | * | 11/1964 | Talbert ........................ 280/35 |
| 3,193,301 A | * | 7/1965 | Talbert et al. ........... 280/43.23 |
| 3,243,193 A | * | 3/1966 | Vivins et al. ................. 280/35 |
| 3,315,974 A | * | 4/1967 | Weaver, Jr. et al. ........ 280/43.2 |
| 3,438,652 A | * | 4/1969 | Hoffacker ................ 280/476.1 |
| 3,631,999 A | * | 1/1972 | Walerowski ................ 414/458 |
| 3,795,336 A | * | 3/1974 | Acker et al. ................ 414/458 |
| 3,834,111 A | * | 9/1974 | Acker et al. ............. 52/745.02 |
| 3,929,241 A | * | 12/1975 | Putnam ...................... 414/458 |
| 4,199,298 A | * | 4/1980 | Webre et al. ............... 414/458 |
| 4,200,305 A | * | 4/1980 | Eubank ...................... 280/404 |
| 4,231,709 A | * | 11/1980 | Corsetti ..................... 414/458 |
| 4,320,607 A | * | 3/1982 | Eubank ........................ 52/143 |
| 4,405,144 A | * | 9/1983 | Chambers .................. 280/404 |
| 4,452,555 A | * | 6/1984 | Calabro ........................ 410/53 |
| 4,762,192 A | * | 8/1988 | Maxwell .................... 180/14.2 |
| 5,129,779 A | * | 7/1992 | Triplett ....................... 414/546 |
| D480,857 S | * | 10/2003 | Wareham .................... D34/28 |
| 6,821,066 B1 | * | 11/2004 | Wehrli ......................... 410/32 |

* cited by examiner

*Primary Examiner*—Eileen D. Lillis
*Assistant Examiner*—Charles Greenhut
(74) *Attorney, Agent, or Firm*—Michael A. O'Neil

(57) ABSTRACT

A carrier apparatus and method includes a pair of oppositely positioned carriers. At least one pair of steerable wheels is connected to at least one of the oppositely positioned carriers. A movable neck is connected to each of the oppositely positioned carriers and by compressive engagement to an object to be carried such that neither the movable neck, nor the pairs of steerable wheels, nor the pair of oppositely positioned carriers are underneath the object.

2 Claims, 6 Drawing Sheets

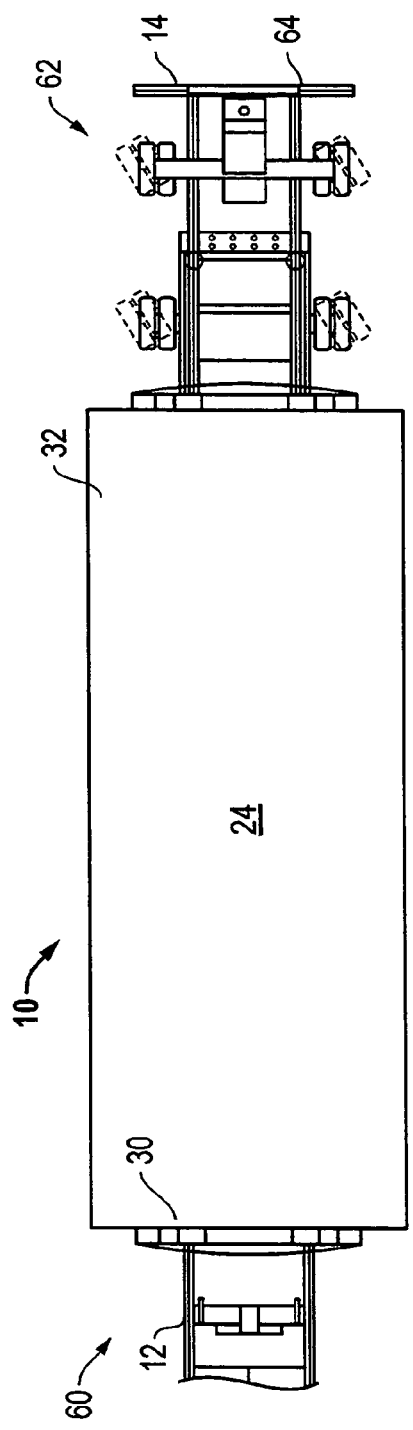
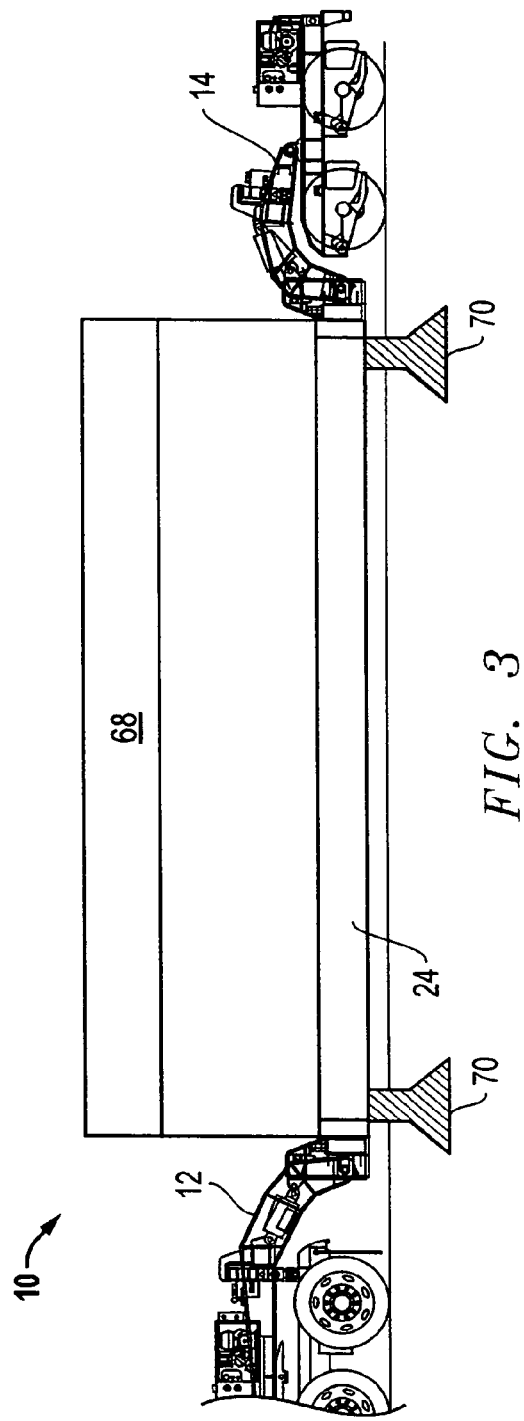

CARRIER APPARATUS AND METHOD

CROSS-REFERENCE TO RELATED APPLICATION

This application is a continuation of application Ser. No. 10/444,707 filed May 23, 2003 now abandoned, currently pending.

TECHNICAL FIELD

This invention relates to a carrier apparatus and method. In particular, according to one embodiment, the invention relates to a carrier apparatus and method for carrying a foundation.

BACKGROUND OF THE INVENTION

The prior art is replete with devices designed to assist individuals in carrying various objects. As the size and weight of a particular object increases, difficulties increase as well. By way of example only, and not by limitation, a difficulty exists in the prior art with attempting to maneuver foundations and, even more particularly, house slabs. The state of art for moving house slabs is represented by U.S. Pat. No. 4,320,607 to Eubank. The Eubank device utilizes a trailer unit with axles located beneath the foundation/slab on each end. This requires the slab to be lifted up and over the axles and then down onto the trailer. This results in the slab being carried high off the ground. The top of the slab for example may be as much as fifty to sixty inches off the ground in the loaded position. This causes instability of an already heavy load and limits the height of any structure that might be carried on the slab, such as a mobile home.

Once the slab has been moved to the proper location, the slab must again be raised up and over the axles so that the trailer may be removed and the slab placed on the ground. Eubank's device utilizes jacks on each corner of the slab to raise the slab off the trailer. This is a dangerous proposition since the slab must be raised above the height of the axles and tires in order for the trailer to be removed. Also, four jacks are required to be used in whatever location the slab is to be placed. This may be uneven ground which again adds to the instability, as the entire slab is lifted on only four independent points. That is, a separate jack is mounted to opposite ends of two steel support spreaders and then separately handled by lifting and attaching them by hard attachment, such as bolts, to the ends of the slab. Further, with equipment located underneath the slab, it is inevitable that someone will be required to get underneath the slab in order to position a piece of equipment while it is in the high and dangerously unstable position.

A further difficulty arises when handling pre-stressed and post tensioned concrete slab products. Pre-stressed and post tensioned concrete products are engineered to be lifted, carried, and supported near their ends. The Eubank device positioned the trailer units at the ends of the slab being transported for just this purpose. The support points in Eubank's device had to be within approximately four feet of the ends or the slab would have broken.

Other carriers have been designed to lift and transport essentially rigid, inflexible containers, such as shipping containers. Concha et al., U.S. Pat. No. 4,297,068, discloses such a shipping container transporter designed to connect to a hard attachment on the rigid container. As the term is used herein, a hard attachment is an attachment such as a bolt, screw, weld or the like that serves to prevent any movement of the attachment once made. Such hard attachments have proven to be the source of failure in prior art devices for transporting semi-rigid, flexible objects such as foundations and slabs, for example only and not by limitation. On the other hand, as used herein "compressive engagement" is a connection to the object to be carried that allows some movement while connected. For example only and not by way of limitation, compressive engagement includes attachments to objects by means of compression.

Thus, there is a need in the art for providing a carrier apparatus and method which enables a user to transport a slab at a minimum distance above the ground and in such a manner that the integrity of the slab is not threatened.

SUMMARY OF THE INVENTION

Accordingly, the carrier apparatus and method of the present invention includes a pair of oppositely positioned carriers. At least one pair of steerable wheels is connected to at least one of the oppositely positioned carriers. A movable neck is connected to each of the oppositely positioned carriers and by compressive engagement to an object to be carried such that neither the movable necks, nor the pairs of steerable wheels, nor the pair of oppositely positioned carriers are underneath the object.

According to another aspect of the invention a compression plate is attached to each of the movable necks. According to further aspects of the invention, a cushion is attached to the compression plate and the compression plate is steel. According to a further aspect of the invention the cushion is selected from a group including rubber and wood.

According to a further embodiment of the invention, at least one tension device is connected between the oppositely positioned carriers for applying tension therebetween. According to a further aspect of the invention, the tension device comprises at least one adjustable rod or cable connected between the oppositely positioned carriers. According to a further aspect of the invention, the tension device comprises a hydraulic device connected to the compression plates and at least two high tensile rods or cables connected to the hydraulic device for applying equal tension to both sides of the carriers and the compression plates thereof.

According to a further embodiment of the invention, the compression plates further include a safety support. In practice a space is provided between the top of the safety support and the bottom of the slab during transit. This enables the carrier to twist during extreme bumps in the road and the rubber cushion between the slab and the face of the slab twists instead of the safety support twisting up into the bottom of the slab. This reduces shock into the slab. According to another aspect of the invention, the movable necks further include a movable support arm for raising and lowering the movable necks.

According to another embodiment, a carrier apparatus, for carrying a foundation above ground wherein the foundation has a top and a bottom defined by edges and a front and a back and two sides, includes a front end carrier and a rear end carrier. Steerable wheels are connected to at least one of the front end carrier and the rear end carrier. Two movable necks are provided, with a first movable neck connected on a first end to the front end carrier and a second movable neck connected on a first end to the rear end carrier. A compression plate is connected to the second end of the two movable necks for transferring compressive engagement pressure to the front and back of the foundation and a tensioning device is connected to the second end of the two movable necks for applying compressive engagement pressure to the foundation through the compression plates.

According to a further embodiment of the invention, a method for carrying a foundation, with a top, a bottom, two sides and a front and a back defined by edges, includes the steps of providing a truck end carrier and a separate rear end carrier wherein at least one of the truck end carrier and the rear end carrier are mounted on steerable wheels.

Movable necks are connected to the truck end carrier and to the rear end carrier. The truck end carrier is abutted to the front of the foundation so as to create a compressive engagement and such that none of the truck end carrier is below the bottom of the foundation. The rear end carrier is abutted to the back of the foundation so as to create a compressive engagement and such that none of the rear end carrier is below the bottom of the foundation. Finally, the front and the back of the foundation are lifted through compressive engagement by the movable necks.

According to another aspect of the invention, a compression plate is provided on each of the movable necks and compressive engagement pressure is applied to the foundation through the compression plates.

DESCRIPTION OF THE DRAWINGS

Other objects, features and advantages of the present invention will become more fully apparent from the following detailed description of the preferred embodiment, the appended claims and the accompanying drawings in which:

FIG. 2 is a top view of the carrier of FIG. 1 connected to a foundation;

FIG. 3 is a side view of the carrier shown in FIG. 2 with a residential or commercial structure shown in place on the foundation;

DETAILED DESCRIPTION OF THE INVENTION

Figure 1:
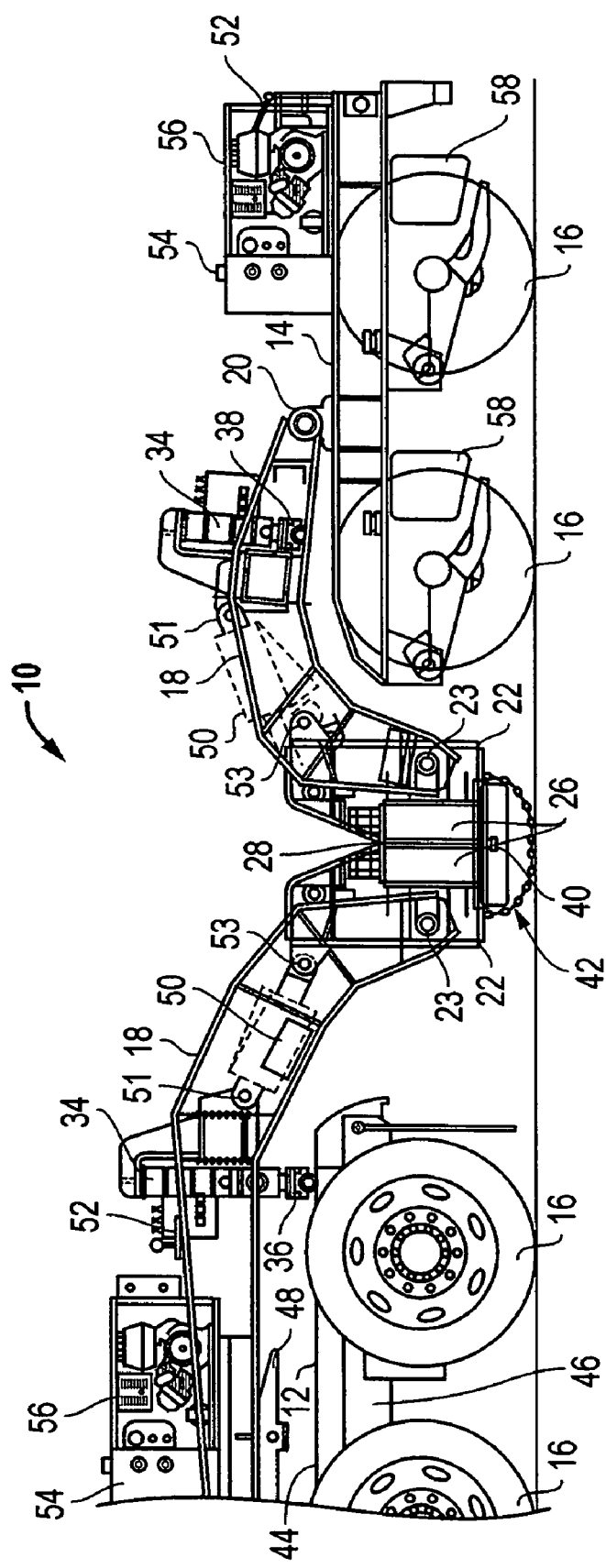
FIG. 1 is a side view of a preferred embodiment of the carrier apparatus of the present invention showing the truck end carrier and the rear end carrier connected together in traveling position.

An embodiment of the present invention is illustrated by way of example in FIGS. 1–11. With specific reference to FIG. 1, the carrier apparatus 10, according to an embodiment of the present invention, includes a pair of oppositely positioned carriers 12 and 14. At least one pair of steerable wheels 16 is connected to at least one of the carrier 12 and carrier 14. A movable neck 18 is connected by a first end 20 to both carriers 12 and 14. Movable necks 18 include a second end 22 which will be more fully described hereafter. As illustrated herein, and as particularly shown in FIGS. 2 and 3, according to a preferred embodiment of the invention, when movable necks 18 are in position next to foundation 24, neither the movable necks 18, nor the pairs of steerable wheels 16, nor the pair of oppositely positioned carriers 12 and 14 are underneath the foundation 24. As used herein, foundation 24 includes any semi-rigid object to be moved including a slab for example only and not by way of limitation.

Still referring to FIG. 1, the second ends 22 of movable necks 18 include, according to one embodiment, a compression plate 26. Compression plate 26 may be of any solid essentially noncompressible material such as steel, for example only. Compression plate 26, according to a further embodiment, includes a cushion 28. Cushion 28 may be any cushion material suitable for the purposes of the invention, including but not limited to rubber and/or wood. Compression plate 26, with or without cushion 28, in use abuts to the front 30 and the back 32 of foundation 24 as illustrated in FIGS. 2, 3, 4 and 6 and as will be discussed more fully hereafter.

Again, still referring to FIG. 1, a movable support arm 34 is connected to movable necks 18. The movable support arms 34, according to a preferred embodiment, hydraulically extend and retract to assist in the operation of carrier apparatus 10 as will be discussed more fully hereafter. The extended position 36 and the retracted position 38 are both illustrated in FIG. 1.

Carriers 12 and 14 are separate items joined together for traveling by pin 40 and removable chain 42 or any method now known or hereafter developed. As illustrated in FIG. 1, carrier 12 may consist of the bed 44 of a truck 46 to which movable neck 18 is connected to a trailer hitch/fifth wheel 48 as is known in the art. In this embodiment, the wheels used to support carrier 12 are simply the wheels of the truck 46 and may or may not be independently steerable wheels 16. For traveling, carrier 14 is connected to carrier 12 as illustrated in FIG. 1.

According to one embodiment of the invention, movable necks 18 are maneuvered by use of hydraulics. As illustrated in FIG. 1, an embodiment of the hydraulic system according to one embodiment includes main lifting cylinders 50, hydraulic controls 52, hydraulic fluid reservoirs 54 and hydraulic power packs 56 all as known in the art. Other features, such as air shock absorbers 58 may be added as well.

The second end 22 of both movable necks 18 is attached by a pin 23 to the back side of the compression plates 26 as illustrated in FIG. 1. The pin 23 connection is a moveable connection close to a midway point in the height of the back side of the compression plates 26. Main lifting cylinders 50 are attached by a moveable pin 51 connection to a point close to the top side of the first end 20 of the moveable necks 18 and to a point near the top of the compression plates 26 by a moveable pin 53 connection, all as illustrated. This allows the compression plates 26 to pivot on the pin 23 connection at the second end 22 of the moveable necks 18 as the main lifting cylinders 50 extend and retract. In a lifting mode, the main lifting cylinders 50 extend to push the top of the compression plates 26 against the top of the foundation 24 while at the same time rotating on the pin 23 connection at the second end of the moveable necks 18 causing the compression plates 26 to pull away from the bottom of the foundation 24. This motion by the main lifting cylinders 50 causes the compression plates 26 to be fully compressed at the top of the foundation 24 and the tensioning device 72 to be fully tensioned below the foundation 24 and causes the slab/foundation 24 to lift by compressive engagement without cracking. The reverse action takes place when lowering the slab/foundation 24.

Referring now to FIG. 2, this top view of carrier apparatus 10 shows carrier 12 abutted to the front 30 of foundation 24 and carrier 14 abutted to the back 32 of foundation 24. The steerable wheels 16 are illustrated by dotted lines as being present on carrier 14 but not on carrier 12. Carrier 12 may also be identified as truck end carrier 60 in that carrier 12, according to one embodiment, is connected to a truck 46 as is known in the art by means of a hitch 48 as discussed above. On the other hand, carrier 14 may be also identified as rear end carrier 62 as it supports the rear or back 32 of foundation 24 as illustrated.

To separate the truck end carrier 60 from the rear end carrier 62, pin 40 and removable chain 42 are removed by hand. Prior to detaching, however, according to one embodiment, movable support arms 34 are extended to the extended position 36 such that the support arm 34 on the movable neck 18 on the truck end carrier 60 presses against the top of the metal frame of the bed 44 of truck 46. This holds the compression plate 26 of the truck end carrier 60 off of the ground as the truck 46 is maneuvered and leaves the rear end carrier 62. Likewise, the movable support arm 34 of the rear end carrier 62 in the extended position presses against the metal frame of the rear end carrier 62 so as to support compression plates 26 of rear end carrier 62 off of the ground as well.

In operation, to position the rear end carrier 62 against foundation 24, the compression plate 26 of the truck end carrier 60 is driven around and temporarily connected firmly to the back bumper 64 of the rear end carrier 62 by a short chain or any other means known in the art. The support arm 34 on the truck end carrier 60 movable neck 18 is retracted to the retracted position 38 thereby allowing movable neck 18 on the truck end carrier 60 to rotate freely around hitch 48, such as a truck fifth wheel as is known in the art. The rear end carrier 62 is then maneuvered to the back 32 of foundation 24 and placed firmly against the back 32 of foundation 24. No hard connection is required by the invention. The steerable wheels 16 also aid in the easing of the placement of rear end carrier 62 in position. Obviously, a self-propelled rear end carrier 62 is another embodiment.

The truck end carrier 60 is then disconnected from the rear end carrier 62 and maneuvered in the same way to the front 30 of foundation 24. The compression plates 26 are positioned in the middle, according to one embodiment of the invention, of the front 30 and back 32 of foundation 24 so that an equal amount of foundation 24 is exposed beyond the ends of the compression plates 26, as illustrated. This allows the compression plates 26 to be of the required legal width for traveling without a foundation 24. As a result, compression plates 26 do not have to be disconnected and handled separately in order to travel without a slab foundation.

Once the compression plates 26 are butted against the foundation 24, the support arms 34 on each of the movable necks 18 hydraulically lift them until, according to one embodiment, a protruding metal safety support 66, as more clearly illustrated in FIG. 5, located at the bottom of compression plates 26 is positioned below the bottom edge of foundation 24. Safety support 66 eliminates any downward movement of the foundation 24 during transit. When safety support 66 is in place as described, compression plates 26 are hydraulically maneuvered from parallel to the edge of the foundation 24 to slightly open at the top so as to push towards each other at the bottom. This position forms a compressive engagement with foundation 24 and is useful when connecting a tensioning device as will be disclosed more fully hereafter with regard to FIG. 4.

Referring now to FIG. 3, carrier apparatus 10 is shown in position to lower foundation 24, along with residential or commercial structure 68, in location at a building site. Because the carrier apparatus 10 of the present invention enables a user to accurately maneuver extraordinarily heavy structures such as foundation 24 and structure 68, the foundation 24 and structure 68 may be precisely placed upon pre-poured piers 70 as illustrated. This allows contractors to determine proper pier placement by soil analysis prior to delivery of foundation 24 thereby insuring long-lasting, structurally sound placement of foundation 24.

Figure 4:
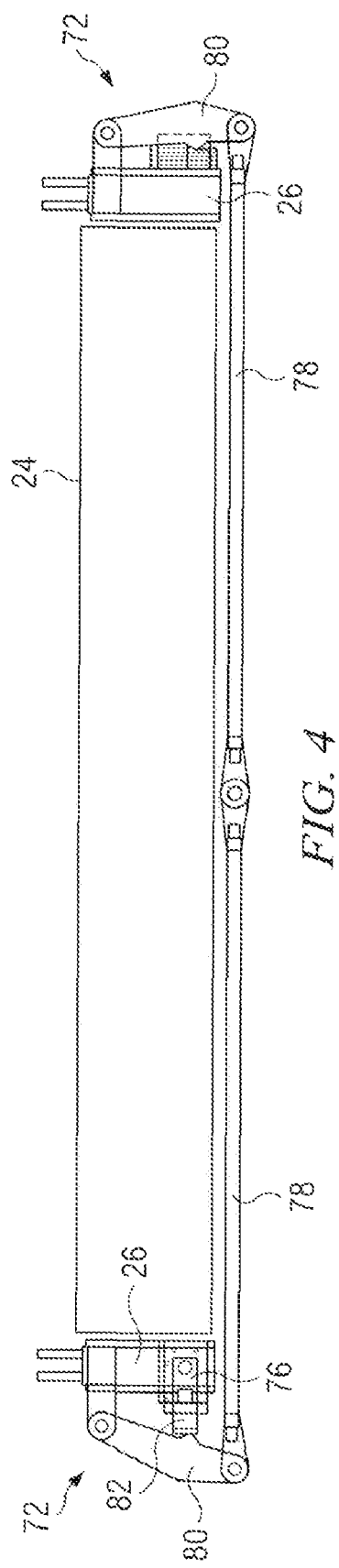
FIG. 4 is a partial, enlarged side view illustrating the tensioning device according to one aspect of the invention.
Figure 5:
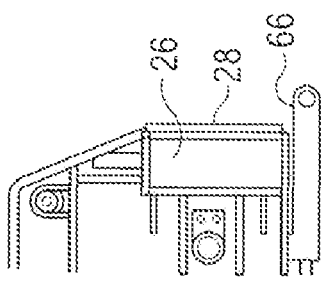
FIG. 5 is a partial, enlarged view of the second end of a movable neck of the carrier illustrating the support shelf.
Figure 6:
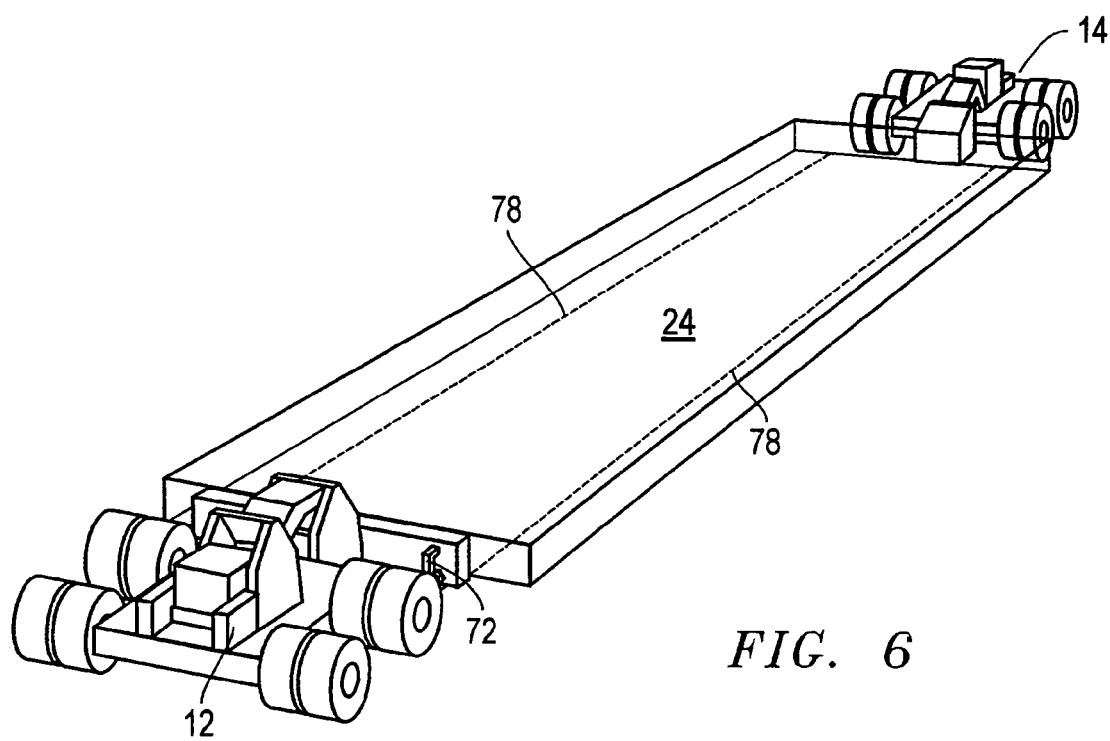
FIG. 6 is a perspective view of the carrier apparatus loaded with a foundation and tensioned with two tension rods or cables.
Figure 7:
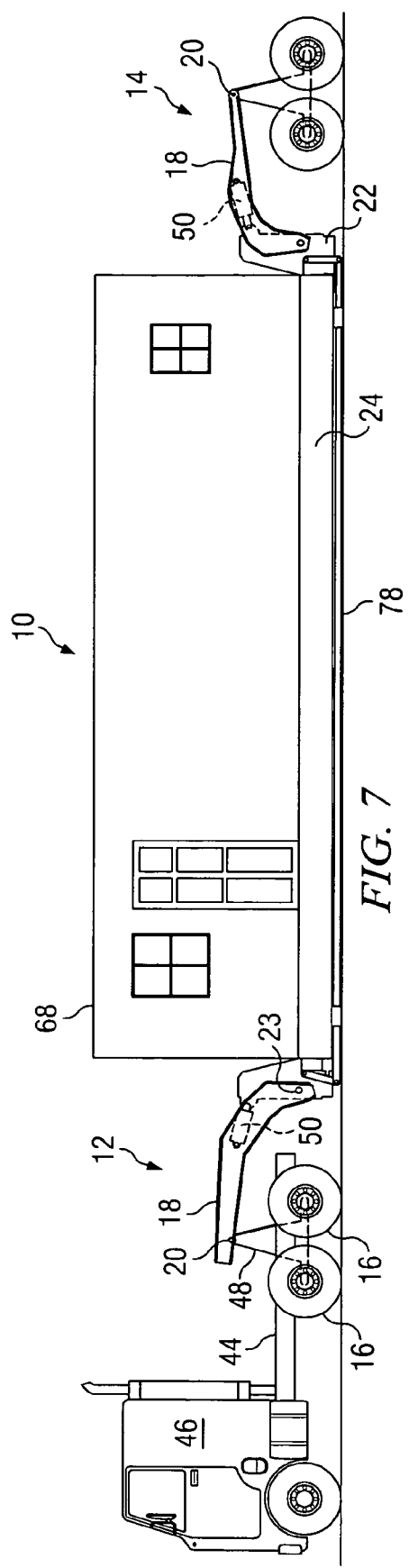
FIG. 7 is an additional side view of the carrier apparatus of the present invention connected to a building and foundation.
Figure 8:
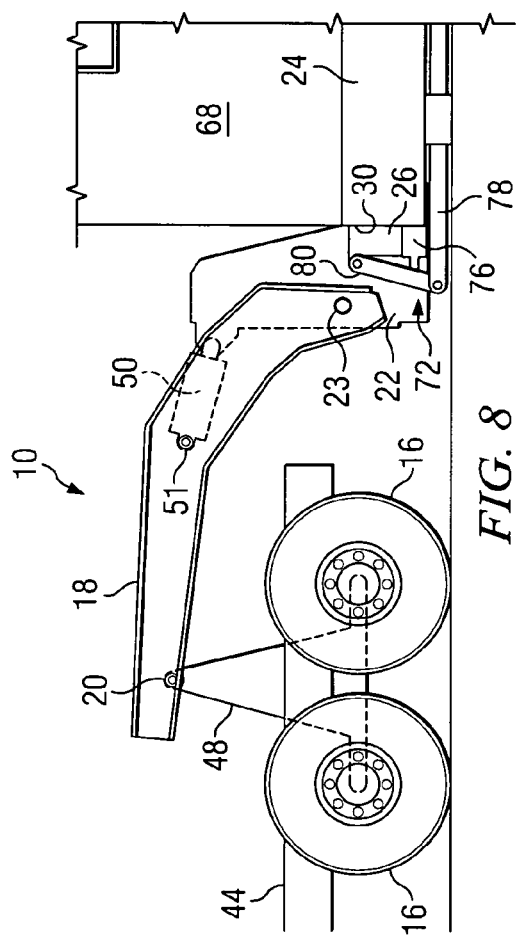
FIG. 8 is an enlarged side view showing a first step in the operation of the carrier apparatus of the present invention.
Figure 9:
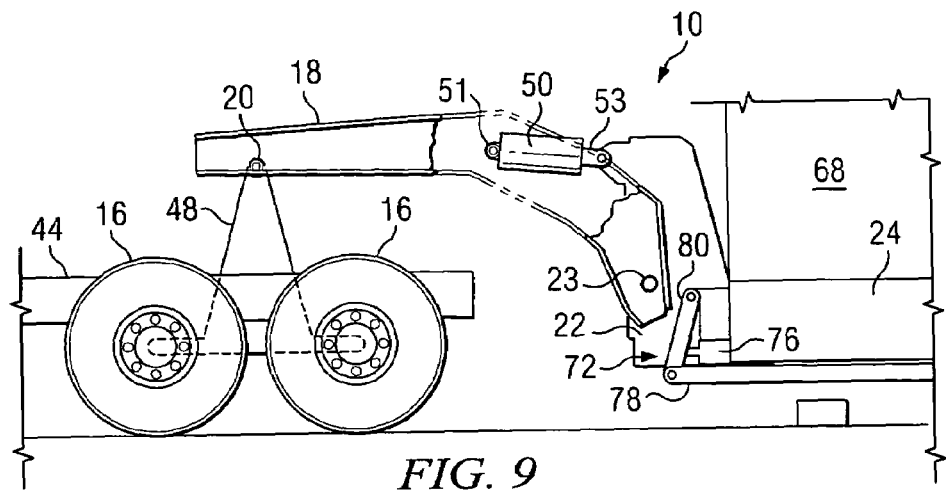
FIG. 9 is a view similar to FIG. 8 showing a subsequent step in the operation of the carrier apparatus of the present invention.
Figure 10:
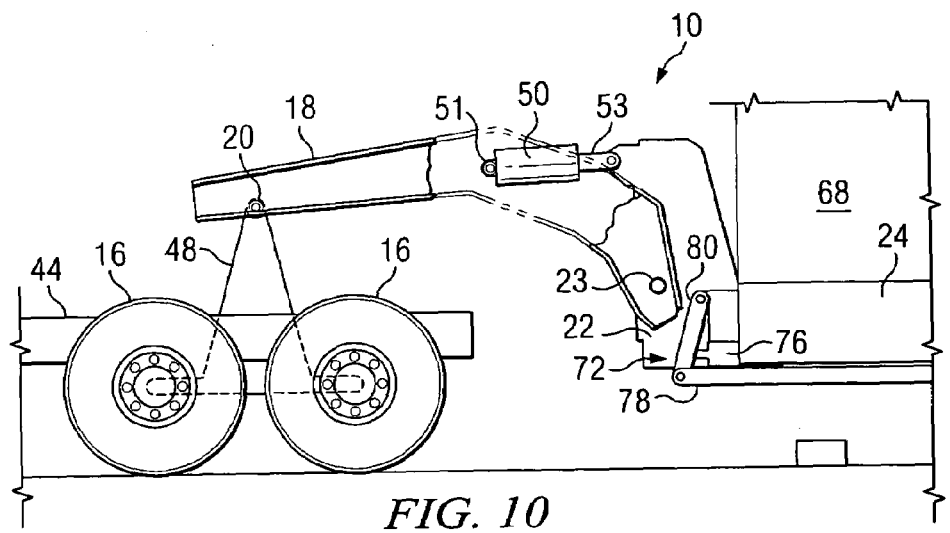
FIG. 10 is a view similar to FIG. 9 showing a still later step in the operation of the carrier apparatus of the present invention.
Figure 11:
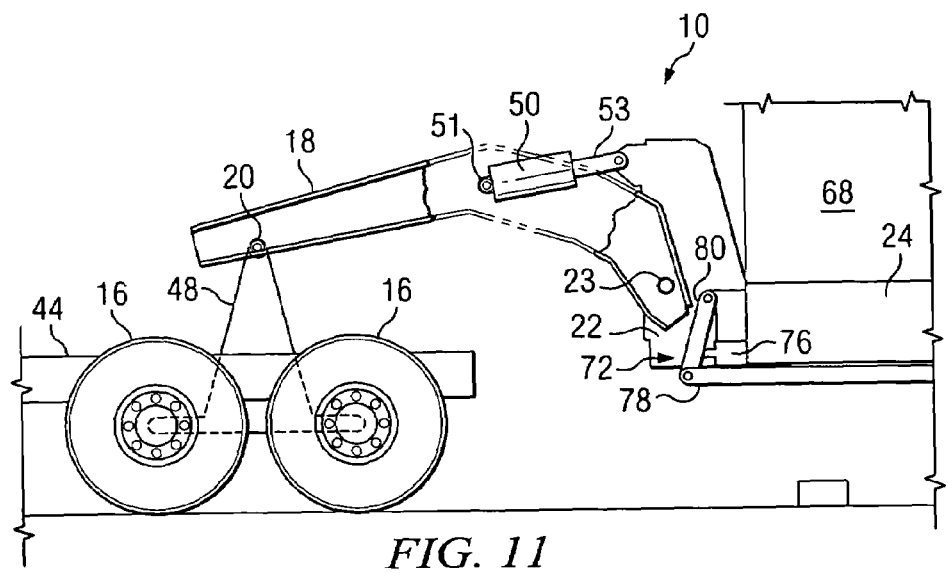
FIG. 11 is a view similar to FIG. 10 showing a still later step in the operation of the carrier apparatus of the present invention.

Referring now to FIG. 4, tension device 72 is illustrated. Here, a pre-cast slab/foundation 24 includes front 30 and back 32. Transverse beams 74 may be present as is known in the art or not. As is known, concrete cannot withstand torque. Applicant's carrier apparatus 10 essentially eliminates this torque by the use of compression plates 26. Again, compression plates 26 are connected to the movable necks 18, as discussed above, so as to abut the ends, front 30 and back 32, of foundation 24 as illustrated. In a preferred embodiment, compression plate 26 is made of high-tensile steel. According to one aspect, the compression plates 26 are close to the same size as the foundation 24 in height but not tall enough to interfere with the structure 68 on top of the foundation 24 if present. Further, Applicant has determined that it is sometimes useful and/or necessary to limit the downward pull at the middle of the foundation 24 and throughout the foundation 24 while the compression plates 26 are pushing against the ends, front 30 and back 32, of foundation 24. According to one embodiment, tension device 72, designed to eliminate this detrimental pull, includes a hydraulic device 76 connected to the compression plates 26. Thereafter at least one tensioning rod and/or cable 78 is connected to the hydraulic device 76. In combination, the hydraulic device 76 and the tensioning rod/cable 78 apply equal tension to the opposite sides of the bottoms of the compression plates 26.

In operation, hydraulic device 76 is attached, as illustrated, to the end of compression plate 26. As more clearly shown in FIG. 6, according to a preferred embodiment, a hydraulic device 76 is attached on either end of compression plate 26. A lever arm 80 is attached to both sets of compression plates 26, that is to the compression plates on truck end carrier 60 and rear end carrier 62 as illustrated. Hydraulic device 76 includes an extendable surface 82. After tensioning rod(s)/cable(s) 78 are attached to lever arms 80, hydraulic device 76 extends extendable surface 82 and applies tension below foundation 24 as described above. Again, as better illustrated in FIG. 6, in a preferred embodiment, two spaced apart tensioning rods/cables 78 are utilized.

In a preferred embodiment, hydraulic devices 76 are used in pairs, again, and are hydraulically plumbed together to equalize the pressure in each cylinder of hydraulic device 76 when pressure is applied to push out lever arm 80 so as to tension the tensioning rods/cables 78 equally. Applicant has determined that it is necessary to ensure that equal compression is applied at the neutral axis at the top of the foundation 24 during lifting and transit. Applicant's carrier apparatus 10 does this since, because of its compressive engagement to the foundation 24, it is capable of adapting to slight differences in the lengths of the rods 78, unequal forces imposed during transit, disproportionate dead loads, contraction and expansion of the hydraulic fluids and the steel in the system caused by heat and cold, etc. Further, all of the hydraulic devices 76 include safety backups, such as shims, in case of pressure failure.

After the compression plates are positioned and abutted to the slab the rods/cables 78 are pre-tensioned the rods to 1000 p.s.i. or until sufficient compression is accomplished. This keeps the compression plates from pulling away at the bottom of the slab (as the compression plates are rotated) by an extreme amount thus creating too much angle at the top. It is necessary for the faces of the compression plates are as vertical as possible to maintain maximum surface area for compressing into the slab at the top and level with the horizontal plane of the floor. The tension rods are not tensioned fully in the beginning because the slab cannot withstand the force at the bottom where the slab is at its weakest point. It is necessary that the compression plates to pull away from the bottom of the slab slightly so the entire compression force is concentrated in the top portion of the slab where the floor surface can evenly distribute such force.

Compression plates 26 are then hydraulically lifted by main lifting cylinders 50 as described above until the foundation 24 reaches its carrying height. As the foundation 24 is lifted, the compression plates 26 come back to parallel with regard to the front 30 and back 32 of foundation 24 so that the lifting forces apply equally across the entire foundation 24. This results in the foundation 24 being compressed and carried by compressive engagement in a cradle position as shown in the figures at a much lower total height than ever before enabled in the prior art. Further, the previously described hydraulics of Applicant's carrier apparatus 10 enable foundation 24 to be lifted and lowered as necessary during transit.

In use, foundation 24 is transported to its new location and, typically, joined side by side to another foundation 24 or to multiple slabs/foundations 24. Carrier apparatus 10 is designed to facilitate such lateral placement of the foundation 24 by hydraulically shifting the compression plates 26. Once in location, foundation 24 is lowered and set on piers 70 by reversing the above described lifting process. At that point, the compressive engagement of carrier apparatus 10 is disjoined from foundation 24 in the reverse order described above and connected back together as illustrated in FIG. 1. The tension rods/cables 78 are loaded in sections or coiled onto a shelf on one of the carriers 12 and/or 14 and secured.

By way of further explanation, Applicant's carrier apparatus 10 allows the foundation 24 to act as the bed of a typical trailer while not having any tires or any other equipment located beneath the foundation 24 within the hollow area of the foundation 24 as is typical in the prior art. Multiple advantages of the Applicant's carrier apparatus 10 are evident. By way of example only and not by limitation, Applicant's carrier apparatus and method 10 enables: a lower riding height, thus enabling a taller structure 68 to be built on top of the foundation 24; adjustment of the riding height of the foundation 24 during transit to accommodate clearance for obstructions both above and below (i.e., a raised railroad crossing or a low bridge overpass); a substantially improved and simplified process of loading and unloading the foundation 24. Overall, Applicant's carrier apparatus and method 10 is much safer to operate and is more stable. In general, this is accomplished by having the foundation 24 coupled by compressive engagement, not by hard attachment, to the carriers 12 and 14 in a cradle position so that the foundation 24 acts as a compression strut. In this way, the carriers 12 and 14 and the foundation 24 act as one unit while the foundation 24 is in motion.

In a preferred embodiment, a pair of hydraulically tensioned rods/cables 78 run the length of foundation 24 at a level just beneath the bottom of foundation 24 and approximately eight feet apart from side to side. The separation distance allows carrier apparatus 10 to be used with different width foundations/slabs/objects, 10 feet, 12 feet, and 14 feet, for example, while still using the same setup. By equally tensioning the rods/cables 78 at the bottom of the compression plates 26 underneath foundation 24 all horizontal force at the bottom of the foundation 24 is eliminated. The tension rods/cables 78, in other words, take all of the horizontal force and the foundation 24 just becomes a compression strut. No additional bending is imposed on the foundation 24 and there is only minimal flexing of the foundation 24 during transit. As a result, the equalized tension in the rods/cables 78 transfers equal compression throughout the top of the foundation 24. Any flexing of the foundation 24 that does occur is enabled by the compressive engagements thus preventing cracking and fracture of the foundation 24 during transport and delivery.

FIGS. 7 through 11 further illustrate the method and apparatus of the present invention.

While the present invention has been disclosed in accordance with the preferred embodiment thereof, it should be understood that there may be other embodiments which fall within the spirit and scope of the invention as defined by the following claims.

What is claimed is:

1. For use in conjunction with concrete slabs having opposed ends, an apparatus for initially lifting a concrete slab relative to, and for thereafter transporting the lifted concrete slab across, an underlying surface comprising:
   a pair of opposed carriers each having a moveable neck;
   means supporting the opposed carriers for movement across an underlying surface;
   each of the movable necks comprising a first piece and a second piece;
   means for pivotally connecting the second piece of each movable neck to the first piece thereof;
   a pair of compression plates each mounted on the second piece of one of the movable necks for engagement with one of the opposed ends of a concrete slab;
   means for pivoting the second piece of each movable neck relative to the first piece thereof;
   wherein the second end pieces of the moveable necks:
   a. engage the compression plates with the opposed ends of a concrete slab;
   b. apply a compressive engagement force to the opposed ends of the concrete slab sufficient to support the concrete slab above the underlying surface, and
   c. thereafter lift the concrete slab relative to the underlying surface; and
   at least one tension member spaced apart from and extending substantially parallel to the concrete slab for applying a predetermined tension between the opposed carriers.

2. A method for initially lifting a concrete slab relative to and for thereafter transporting the lifted concrete slab across, an underlying surface comprising:
   providing a concrete slab having opposed ends;
   providing a pair of opposed carriers;

supporting the opposed carriers for movement across an underlying surface;

providing each of the opposed carriers with a movable neck comprising a first piece and a second piece;

pivotally connecting the second piece of each movable neck to the first piece thereof;

providing a compression plate on the second piece of the movable neck of each of the opposed carriers for engagement with one of the opposed ends of a concrete slab;

pivoting the second end piece of each movable neck relative to the first end piece thereof and thereby sequentially:

a. engaging the compression plates with the opposed ends of a concrete slab;

b. applying a compressive engagement force to the opposed ends of the concrete slab sufficient to support the concrete slab above the underlying surface, and c. thereafter lifting the concrete slab relative to the underlying surface;

providing at least one tension member;

positioning the tension member in a spaced apart, substantially parallel relationship to the concrete slab;

connecting the tension member between the opposed carriers; and maintaining the tension member in tension during the steps of applying a compressive force to the opposed ends of the concrete slab and lifting the concrete slab.

\* \* \* \* \*